Patented June 13, 1944

2,351,301

UNITED STATES PATENT OFFICE 2,351,301

PLASTIC COMPOSITION

Harold Marvin Sonnichsen, Niagara Falls, N. Y., assignor to E. I. du Pont de Nemours & Company, Wilmington, Del., a corporation of Delaware No Drawing. Application September 2, 1941, Serial No. 409,267

8 Claims. (Cl. 260—36)

This invention relates to plastic compositions. More particularly, it relates to compositions comprising plasticized partial esters of polyvinyl alcohol which are unusually soft but which at the same time are elastic and resilient to an exceptional degree.

Polyvinyl alcohol and certain derivatives thereof have been employed to a considerable extent in recent years for the preparation of molded and extruded articles, such as gaskets, tubing, containers for hydrocarbon fuels and organic solvents, and for similar purposes where a high degree of resistance to the action of such solvents is required in addition to good mechanical properties, such as strength and resiliency. In fabricating such articles it has been customary to incorporate in the polyvinyl alcohol plasticizers such as glycerol, ethylene glycol and other glycols, formamide, sugars, dextrin, sorbitol, glucose-amine, ethanol formamide, ethanol acetamide, various ethanolamines and salts thereof, etc. Most of these plasticizers are satisfactory for imparting to polyvinyl alcohol the degree of plasticity requisite for the manufacture of comparatively firm molded articles such as tubing, gaskets and the like, but they have not proven satisfactory for the preparation of softer moldings.

Within certain limits, of course, the hardness of the molded polyvinyl alcohol composition decreases in proportion to the amount of plasticizer contained therein. However, as the proportion of plasticizer is increased, a definite upper limit is reached where the plasticized polyvinyl alcohol loses its elastic and resilient properties and becomes permanently deformed under stress. When the usual plasticizers are incorporated in polyvinyl alcohol in proportions sufficient to produce a molding having a hardness of less than about 80, as determined on the Shore Durometer, the molded articles begin to lose their elastic properties and to exhibit the phenomenon commonly known as "cold flow," i. e., they undergo permanent deformation under stress.

For certain purposes there is a need for compositions having the desirable solvent resistant properties of polyvinyl alcohol and at the same time possessing a combination of softness and resiliency not attained hitherto in the known plasticized polyvinyl alcohol compositions. For example, in the manufacture of printing rollers it would be desirable to utilize a material having greater resistance to the action of solvents contained in printing inks than the soft rubber which has been commonly used for this purpose in the past. Polyvinyl alcohol would be ideal for this purpose if it were possible to plasticize it to such an extent as to produce a Shore Durometer hardness on the order of 10 to 20 and still retain enough resiliency and elasticity so that the surface of the roller would immediately recover its original smooth surface after receiving the imprint of the type. As has been noted above, a combination of these somewhat antithetical properties has not been attained in the plasticized polyvinyl alcohol compositions known heretofore.

It is, accordingly, an object of the present invention to provide improved plastic compositions which are soft but highly elastic and resilient. A further object is to provide plasticized derivatives of polyvinyl alcohol which are suitable for the manufacture of printing rollers and the like. Further objects and advantages of the invention will be apparent from the ensuing description thereof.

I have discovered that plastic compositions having the desirable characteristics noted above can be obtained by selecting a partially esterified polyvinyl alcohol within a specific range of esterification and incorporating therein a plasticizer comprising a polyglycol or an alkyl ether thereof in certain definite proportions. In order to secure the desirable properties characteristics of the compositions of my invention, three critical factors are involved, viz. (1) the degree of esterification of the polyvinyl alcohol, (2) the specific class of chemical compounds utilized as the plasticizing agents, and (3) the relative proportions of the partially esterified polyvinyl alcohol and the plasticizer. None of these factors individually will suffice to give the desired properties; it is essential that all three be combined.

The partial esters of polyvinyl alcohol which are suitable for the purposes of the present invention are those in which from about 15% to 65% of the hydroxyl radicals in the polyvinyl alcohol are esterified. Preferably, partial esters wherein 25% to 60% of the hydroxyl groups are esterified are selected. These partial esters of polyvinyl alcohol may be prepared either by the hydrolysis of polymerized vinyl esters or, conversely, by the partial esterification of the polyvinvyl alcohol. One of the most satisfactory methods for preparing such partial esters is that described in United States Patent No. 2,227,997 to Herbert Berg.

The plasticizers which are incorporated into the partial esters of polyvinyl alcohol in accordance with the present invention are polyglycols containing from 4 to 20 carbon atoms in the molecule and the alkyl ethers of such polyglycols. These compositions have the general formula RO(CH$_2$CH$_2$O)$_n$R$_1$, wherein R and R$_1$ designate members of the group consisting of hydrogen and alkyl radicals, and $n$ is an integer from 2 to 10. More specifically, I may use diethylene glycol, triethylene glycol, tetraethylene glycol, pentaethylene glycol, hexaethylene glycol, heptaethylene glycol, octaethylene glycol, nonaethylene glycol, decaethylene glycol, and the mono- and di- methyl, ethyl, propyl and butyl ethers thereof.

The relative proportions of the partial ester to plasticizer in the compositions of the invention should fall within the range of 30% to 80% by weight of the partial ester to 70% to 20% by weight of the plasticizer. The preferred range is 35% to 50% of the partial ester and 65% to 50% of the plasticizer.

The plasticizer may be incorporated into the polyvinyl alcohol by any of the usual methods known in the plastic arts, e. g. by mechanically working them together as in a kneading machine, with or without the use of heat and/or pressure. Mutual solvents or swelling agents for the plasticizer and the partial ester may be employed with subsequent elimination of the solvent or swelling agent. The plasticized compositions may then be molded, extruded, or otherwise formed into the desired shape by the usual methods. Thus, for example, in the manufacture of printing rolls, the plasticized compositions may be heated to a temperature above their melting point and then molded by casting, compression or injection methods, or a sheet of the composition may be wound around a mandrel and heated in a suitable mold with or without pressure until it has attained the desired form. The temperatures required for molding these compositions depend upon the pressure applied and the percentage of polyglycol present and will usually vary from about 70° C. to about 200° C.

The more detailed practice of the invention is shown in the following examples, which are merely illustrative and are not to be regarded as restrictive. In these examples all parts are by weight.

Example 1

600 parts of a partial acetate of polyvinyl alcohol having a saponification number of 400 to 450 (equivalent to about 53% to 63% esterification of the hydroxyl groups) was mixed with 1300 parts of methanol and allowed to stand until the resin had swollen sufficiently to absorb all of the solvent. The swollen resin was then placed in a kneader together with 900 parts of triethylene glycol and the mixture kneaded until a uniform mass was obtained. The mixture was then heated to a temperature sufficient to evaporate the methanol. The product was a light-colored, rubbery material having a Shore Durometer hardness of from 10 to 15, and a melting point of 120 to 130° C. It was exceedingly elastic and resilient.

This material was formed into a printing roller by casting in a mold at a temperature of 140–150° C. The roller thus produced was highly resilient, showed excellent resistance to printing ink solvents, and possessed exceptional durability.

Example 2

400 parts of a partial acetate of polyvinyl alcohol having a saponification number of approximately 250 (equivalent to 24% esterification of the polyvinyl alcohol) was mixed with 600 parts of triethylene glycol in a kneader for three to six hours. The resulting powder was molded at temperatures of 100 to 120° C. at a pressure of 1000 pounds per square inch to give a very resilient transparent sheet having a Shore hardness of 50 to 55 and a melting point of 155 to 175° C.

Example 3

600 parts of a partial acetate of polyvinyl alcohol of saponification number 400 to 450 was swollen with 1300 parts of methanol as described in Example 1, then mixed in a heated kneading apparatus with 900 parts of tetraethylene glycol. Heating was continued until the methanol had distilled off, whereupon the product was obtained as a light-colored, elastic mass of melting point 130 to 140° C. which could be molded at 130 to 150° C. into a sheet having a Shore hardness of 12.

Example 4

600 parts of a partial acetate of polyvinyl alcohol of saponification number of 400 to 450 was swollen with 1300 parts of methanol mixed with 900 parts of the dimethyl ether of tetraethylene glycol, O(CH$_2$CH$_2$OCH$_2$CH$_2$OCH$_3$)$_2$, in a heated kneading machine, kneaded and heated until all the methanol had distilled off. The product was a voluminous mass of white crumbs which could be molded at 150 to 170° C. into an extremely elastic sheet having a Shore hardness of 20 to 25.

Example 5

75 parts of a partial acetate of polyvinyl alcohol having a saponification number of 250 was mixed with 25 parts of triethylene glycol and the resulting mixture allowed to stand for four days. It was then molded into a light-colored, translucent, resilient sheet having a Shore hardness of 80.

Example 6

Mixtures of partial acetates of polyvinyl alcohol having saponification numbers in the range of 400 to 500 and hexaethylene glycol were prepared in accordance with the procedure described in Example 1. Molded discs prepared from these compositions were light-colored, rubbery and elastic. The discs had the following hardness as measured by the Shore Durometer:

| Percentage of hexaethylene glycol in composition | Shore hardness |
| --- | --- |
| 25 | 43 |
| 50 | 23 |
| 60 | 21 |

Example 7

Mixtures of nonaethylene glycol and partial acetates of polyvinyl alcohol having saponification numbers in the range 400 to 450 were prepared as described in Example 1. Moldings prepared from these compositions were rubbery and elastic, light-colored and easily molded at 130 to 140° C. The Shore Durometer hardnesses were as follows:

| Percentage of nonaethylene glycol in composition | Shore hardness |
| --- | --- |
| 25 | 38 |
| 50 | 21 |
| 60 | 15 |

Example 8

60 parts of a partial acetate of polyvinyl alcohol having a saponification number of 400 to 450 was allowed to stand with 130 parts of methyl alcohol until thoroughly swollen. It was then placed in a kneading machine and 83 parts of triethylene glycol added. The mixture was heated and kneaded until the methyl alcohol was distilled off. 60 parts of carbon black was added to the molten mixture and the mass kneaded and heated for an additional thirty minutes. The molding prepared from this mixture had a Shore hardness of from 30 to 35; it was elastic and resilient but slightly more tacky than the compositions prepared in the preceding examples.

As has been noted above, it is not only the character of the plasticizer and the proportions thereof which determine the softness and elasticity of the plasticized polyvinyl alcohol, but the degree of esterification of the polyvinyl alcohol is also critical. For purposes of comparison of the effect of the polyglycol plasticizers on the partially esterified alcohols and polyvinyl alcohol itself, reference may be had to the following example.

Example 9

Mixtures of a polyvinyl alcohol substantially free from residual ester groups (saponification number below 10) and triethylene glycol were prepared by adding the plasticizer to the dry polyvinyl alcohol in a kneading machine, where they were mixed and heated until the plasticizer had been absorbed. The resultant compositions were sealed in bottles for several days and then molded under a pressure of 600 to 700 pounds per square inch in presses, the platens of which were heated to a temperature of 165° C. The Shore hardnesses of the moldings thus obtained were as follows:

| Percentage triethylene glycol in composition | Shore hardness |
|---|---|
| 20 | 97 |
| 30 | 95 |
| 40 | 95 |
| 50 | 97 |
| 60 | 97 |

It will be noted that in the case of unesterified polyvinyl alcohol, any increase in the triethylene glycol composition above about 20% resulted in no significant decrease in the Shore hardness of the composition. Also, in compositions containing more than 30% of plasticizer, it was observed that there is a tendency for the plasticizer to exude from the surface of the composition.

Both the polyethylene glycols and the ethers thereof are effective for preparing compositions having the requisite degree of softness in combination with elasticity and resiliency, and for many purposes either class of plasticizer may be used with equally satisfactory results. However, the compositions plasticized with the polyglycols are superior to those plasticized with the polyglycol ethers with respect to resistance to certain solvents, especially solvents of the nature of turpentine, linseed oil and aliphatic hydrocarbons, which are common ingredients of printing ink compositions. Accordingly, where resistance to action of solvents of this nature is an important factor, I prefer to use the polyglycols rather than the ethers.

While for many purposes the compositions consisting solely of the partial esters of polyvinyl alcohol and the plasticizer are satisfactory, it may be desirable in certain instances to add to these compositions other ingredients, such as fillers, dyes, pigments and the like in accordance with the usual practices in the art.

Although, as has been pointed out heretofore, the compositions of the present invention are particularly useful for the fabrication of printing rollers, their utility is, of course, not restricted to this particular application. In general, they may be utilized advantageously wherever a plastic material having the qualities of softness combined with elasticity and resiliency is desired, as, for example, in printing blankets and in hectograph pads. In regard to such uses, it may be noted that the compositions of the present invention have certain pronounced advantages over the usual glue-glycerol compositions. In particular, they are not so susceptible to changes in atmospheric humidity; they have better aging properties, i. e., they do not tend to harden after prolonged use; and they have a tensile strength considerably exceeding that of glue-glycerol compositions. In addition, their higher melting points make possible their utilization under high temperature conditions which cannot be tolerated by the lower melting glue-glycerol compositions.

It is to be understood that the invention is not restricted to the specific embodiments described hereinabove, but includes all such modifications, variations and equivalents as fall within the scope of the appended claims.

I claim:

1. An elastic, resilient, rubber-like molded article free from water and composed essentially of a substantially homogeneous mixture of a partial ester of polyvinyl alcohol wherein 15 to 65% of the hydroxyl groups are esterified and a compound of the formula $RO(CH_2CH_2O)_nR'$ wherein R and R' designate members of the group consisting of hydrogen and alkyl radicals and $n$ is an integer of from 2 to 10, said mixture containing 35 to 50% by weight of said polyvinyl alcohol and 65 to 50% by weight of said compound.

2. An elastic, resilient, rubber-like molded article free from water and composed essentially of a substantially homogeneous mixture of a partial acetate of polyvinyl alcohol wherein 15 to 65% of the hydroxyl groups are esterified and a compound of the formula $RO(CH_2CH_2O)_nR'$ wherein R and R' designated members of the group consisting of hydrogen and alkyl radicals and $n$ is an integer of from 2 to 10, said mixture containing 35 to 50% by weight of said polyvinyl alcohol and 65 to 50% by weight of said compound.

3. An elastic, resilient, rubber-like molded article free from water and composed essentially of a substantially homogeneous mixture of a partial ester of polyvinyl alcohol wherein 15 to 65% of the hydroxyl groups are esterified and a polyethylene glycol containing 4 to 20 carbon atoms, said mixture containing 35 to 50% by weight of said polyvinyl alcohol and 65 to 50% by weight of said glycol.

4. An elastic, resilient, rubber-like molded article free from water and composed essentially of a substantially homogeneous mixture of a partial acetate of polyvinyl alcohol wherein 15 to 65% of the hydroxyl groups are esterified and a polyethylene glycol containing 4 to 20 carbon atoms, said mixture containing 35 to 50% by weight of said polyvinyl alcohol and 65 to 50% by weight of said glycol.

5. An elastic, resilient, rubber-like molded article free from water and composed essentially of a substantially homogeneous mixture of a partial ester of polyvinyl alcohol wherein 15 to 65% of the hydroxyl groups are esterified and a triethylene glycol containing 4 to 20 carbon atoms, said mixture containing 35 to 50% by weight of said polyvinyl alcohol and 65 to 50% by weight of said glycol.

6. An elastic, resilient, rubber-like molded article free from water and composed essentially of a substantially homogeneous mixture of a partial ester of polyvinyl alcohol wherein 15 to 65% of the hydroxyl groups are esterified and a tetraethylene glycol containing 4 to 20 carbon atoms, said mixture containing 35 to 50% by weight of said polyvinyl alcohol and 65 to 50% by weight of said glycol.

7. An elastic, resilient, rubber-like molded article free from water and composed essentially of a substantially homogeneous mixture of a partial acetate of polyvinyl alcohol wherein 15 to 65% of the hydroxyl groups are esterified and a triethylene glycol containing 4 to 20 carbon atoms, said mixture containing 35 to 50% by weight of said polyvinyl alcohol and 65 to 50% by weight of said glycol.

8. An elastic, resilient, rubber-like molded article free from water and composed essentially of a substantially homogeneous mixture of a partial acetate of polyvinyl alcohol wherein 15 to 65% of the hydroxyl groups are esterified and a tetraethylene glycol containing 4 to 20 carbon atoms, said mixture containing 35 to 50% by weight of said polyvinyl alcohol and 65 to 50% by weight of said glycol.

HAROLD MARVIN SONNICHSEN.